E. H. REDINGTON.
DRIVE GEARING FOR POWER PRESSES.
APPLICATION FILED SEPT. 28, 1911.
1,032,940.
Patented July 16, 1912.
2 SHEETS—SHEET 1.
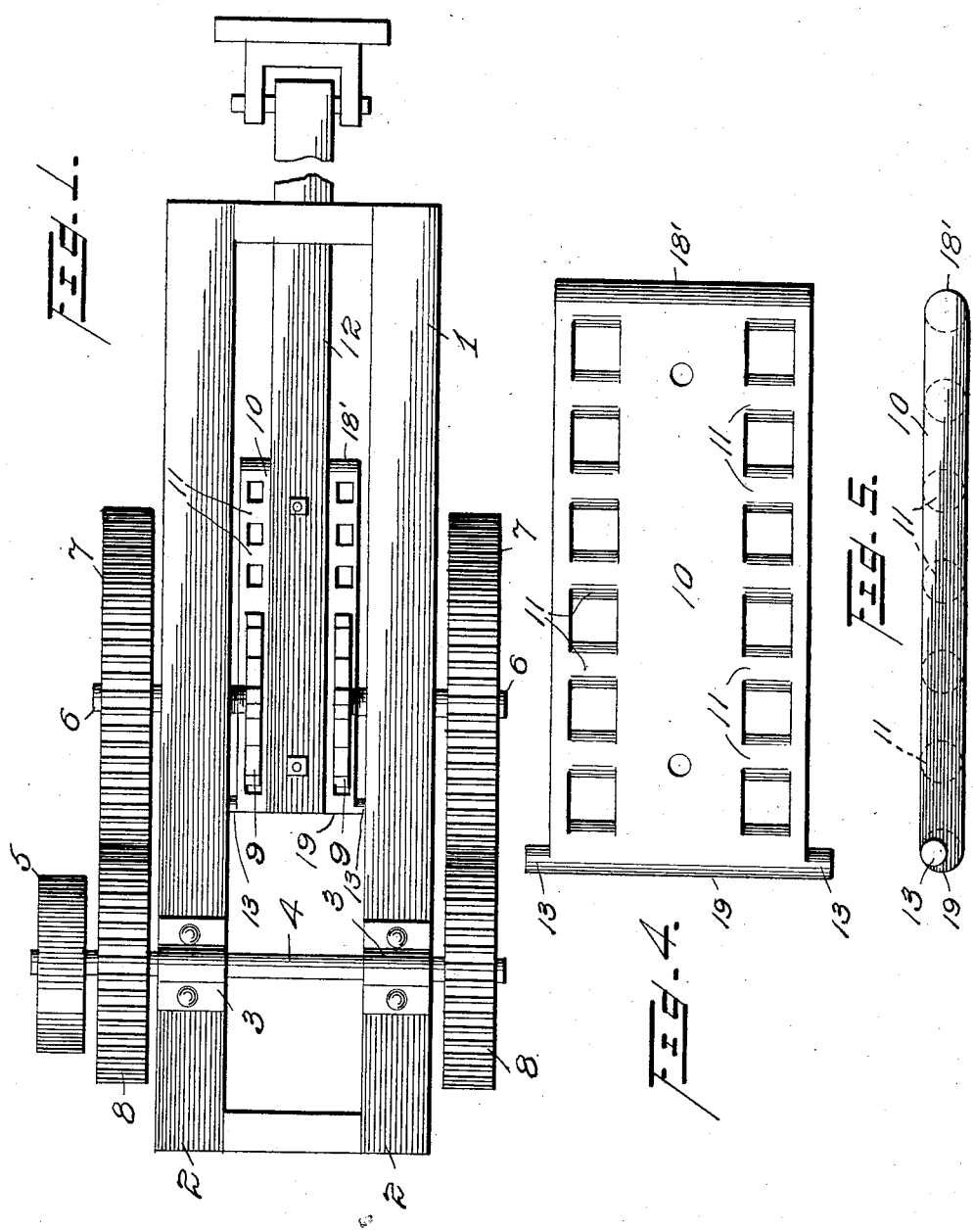

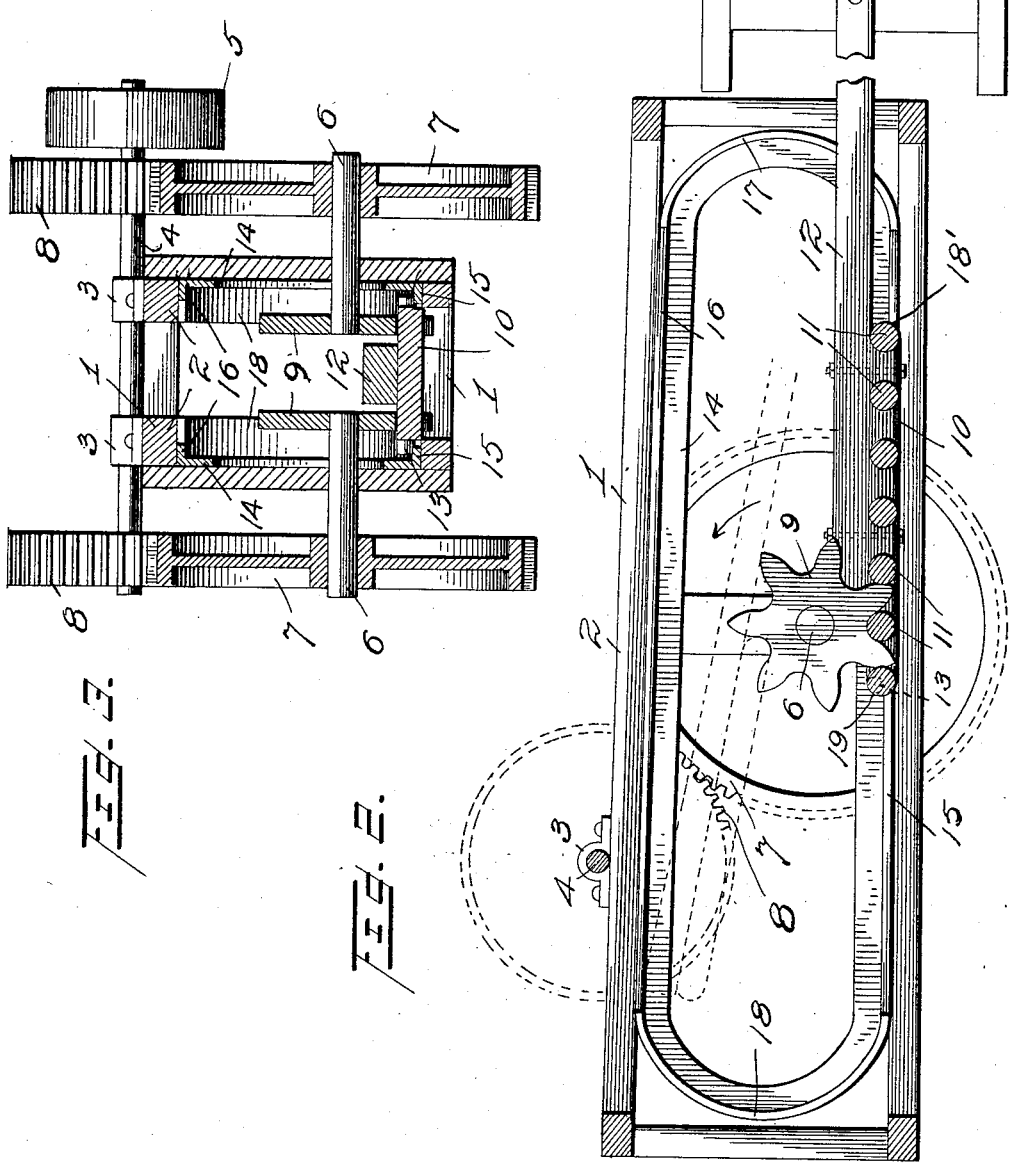

UNITED STATES PATENT OFFICE.

EDWARD H. REDINGTON, OF NEODESHA, KANSAS.

DRIVE-GEARING FOR POWER-PRESSES.

1,032,940.  Specification of Letters Patent.  Patented July 16, 1912.

Application filed September 28, 1911. Serial No. 651,761.

*To all whom it may concern:*

Be it known that I, EDWARD H. REDINGTON, a citizen of the United States, residing at Neodesha, in the county of Wilson and State of Kansas, have invented new and useful Improvements in Drive-Gearing for Power-Presses, of which the following is a specification.

This invention relates to drive gearing for power presses, such as baling presses and other compresses, the object of the invention being to provide simple, effective and powerful mechanism for operating the pitman of such compresses and other power-driven apparatus, which operating mechanism will be compact in form and require less driving power than the ordinary eccentric or crank-driven mechanism, and at the same time more rapid in speed and adapted to give more direct driving force with less power.

The invention consists of the features of construction, combination and arrangement of parts, hereinafter fully described and claimed, reference being had to the accompanying drawing, in which:—

Figure 1 is a top plan view of a drive gearing embodying my invention. Fig. 2 is a vertical longitudinal section of the same. Fig. 3 is a vertical transverse section. Fig. 4 is a plan view of the rack plate. Fig. 5 is a side view thereof.

Referring to the drawings, 1 designates a suitable supporting frame, embodying spaced side members 2, carrying bearings 3 for a transverse main drive shaft 4, which may be driven by a belt pulley 5 from any suitable source of power, or directly from the gas engine attached to the frame.

Journaled in the respective side portions of the frame are transverse shafts 6, which carry gears 7 meshing with and driven from gears 8 on the shaft 4, the sets of gears being duplicate in diameter and construction, so that the two shafts 6 will be driven at corresponding rates of speed. The inner ends of the respective shafts 6 carry transmission gear pinions 9 arranged in spaced relation, as shown.

Arranged for movement between the sides 2 of the frame is a rack plate 10 provided along its opposite longitudinal side edges with rounded teeth 11 engaged by the teeth of the pinions 9, said rack plate being bolted or otherwise secured to the rear end of the pitman rod 12 and provided at its rear end with laterally extending guide pins or trunnions 13. Secured to or formed upon the frame member 2 are elliptical guide brackets 14, provided with lower inwardly extending guide rails or flanges 15 corresponding to the inwardly extending stop rails or flanges 16 and front and rear inwardly-extending curved abutments or guide flanges 17 and 18, which project inwardly a somewhat greater distance than the flanges 15 and 16.

In the normal position of the parts, when the pitman 12 is retracted or at the limit of its outward or rearward stroke, the guide pins or trunnions 13 rest upon the flanges 16 and support the weight of the rear end of the rack plate, the front ends of which are properly rounded to form abutment portions 18′ and 19. The teeth of the rack plate are thus held in engagement with the lowermost teeth of the pinions 9, which are revolved rearwardly in the direction of the arrow shown in Fig. 2, so as to impart forward motion to the rack plate and pitman 12, as will be readily understood. At the limit of the forward movement of the rack plate and pitman, the abutment portion 18′ of the plate comes in contact with the flanges 17 and is guided upwardly thereby, at which time the rear teeth or surface 19 of the plate lies in position to be engaged by the foremost of the lower teeth of the pinions 9. As a result the rear end of the rack plate will be lifted and carried upwardly and rearwardly by the teeth of the pinions 9, the portion 18′ pivoting on the flanges 17 during such reversal of the stroke of the rack plate, which is held in engagement with the pinions by its own weight and that of the pitman. When the rear end of the rack plate is elevated a certain distance above the horizontal, it will begin to travel upwardly with the uppermost teeth of the pinions 9, and such motion will be continued to carry the rack plate backward on its return stroke until the forward portion 18′ of said rack plate is engaged by the descending teeth of the pinions 9. At this time the trunnions 13 and rear transverse tooth or abutment surface 19 will engage the rear abutment or guide flanges 18, on which such end of the plate will pivot and slide downward as the plate descends on its reversal from a backward to a forward stroke position. In such operation it will of course be apparent that the pitman 12 will be moved on its backward or return stroke, and that when the rack plate reaches a substantially horizontal position in rear of the pinion the succeeding forward stroke will begin, and the parts will assume the normal position ready for the forward stroke before described. Fig. 3 shows in full and dotted lines the different positions assumed by the rack plate and pitman in their backward travel.

It will thus be understood from the foregoing description that on the forward movement of the rack plate the pitman will be impelled on its working stroke, while upon the rearward movement of the rack plate the pitman will be retracted, and it will be seen that the construction of the gearing provides for a positive and powerful driving action, without slippage or lost motion, whereby a high degree of propulsive force may be imparted to the pitman without the necessity of employing high driving power and without the loss of power experienced in the use of cranks or eccentrics. Rapid motion and application of power is also secured, as there is practically no waste of power or loss of time in the shifting of the parts from one stroke to another.

While the invention is primarily designed for operating the pitmen of baling presses and other compresses, it will of course be understood that it may be employed for driving the pitmen of other kinds of machinery. The flanges 16 serve as stops to coöperate with the projections 13 to limit the upward movement of the rack plate.

Having thus described the invention, what I claim as new is:

The combination with a pitman, of a supporting frame, a pair of spaced longitudinal elliptical guide brackets mounted on the frame, said brackets being provided with upper and lower guide rails and curved end abutments connecting the same, said abutments being of greater width than the rails, a double rack plate secured to the pinion and having lateral trunnions at its rear end and guiding surfaces at its opposite ends for coöperation with said track rails and abutments, to adapt said rack plate to move in a substantially elliptical path, pinions meshing with the teeth of the rack plate, transverse shafts carrying said pinions, gears open said shafts, a transverse drive shaft, and gears carried by said shaft and meshing with the first-named gears.

In testimony whereof I affix my signature in presence of two witnesses.

EDWARD H. REDINGTON.

Witnesses:
ERNEST O. TAYLOR,
DAVID C. BASORE.

---

Copies of this patent may be obtained for five cents each, by addressing the "Commissioner of Patents, Washington, D. C."